April 18, 1961  F. A. ARBOUR  2,980,151
MACHINE FOR CUTTING BILLETS FROM A BLOCK
Filed Dec. 19, 1957  2 Sheets-Sheet 1

Inventor
Foy A. Arbour
By Schroeder, Hofgren,
Brady & Wegner
Attorneys

April 18, 1961 F. A. ARBOUR 2,980,151
MACHINE FOR CUTTING BILLETS FROM A BLOCK
Filed Dec. 19, 1957 2 Sheets-Sheet 2
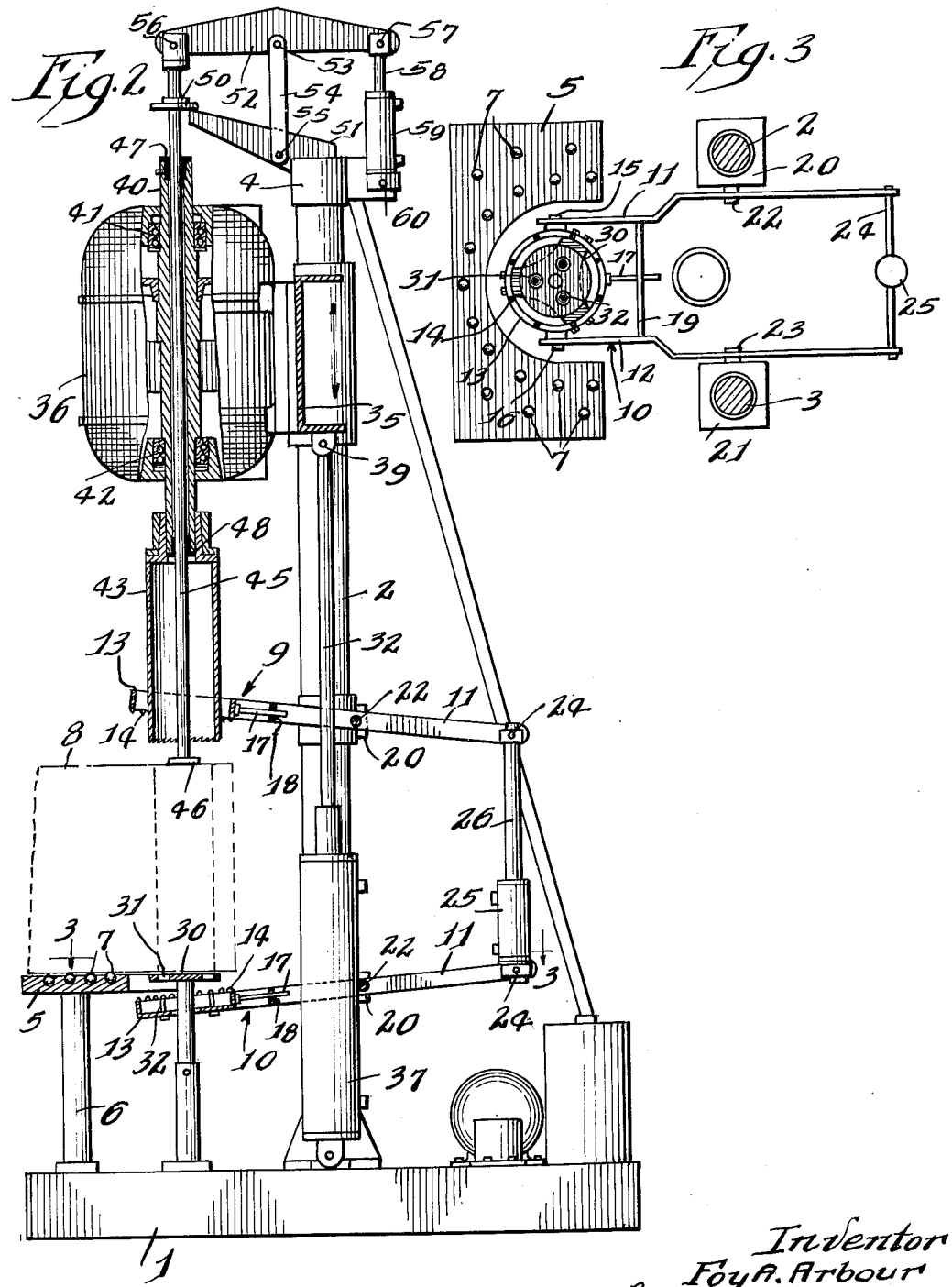
Inventor
Foy A. Arbour
By Schroeder, Hofgren,
Brady & Wegner
Attorneys United States Patent Office 2,980,151
Patented Apr. 18, 1961

2,980,151
MACHINE FOR CUTTING BILLETS FROM A BLOCK

Foy A. Arbour, Gladstone, Mich., assignor to Arbour Box Company, a partnership, and Brunswick Corporation, a corporation of Delaware, jointly Filed Dec. 19, 1957, Ser. No. 703,865

4 Claims. (Cl. 143—85)

This invention relates to a billet forming machine and more particularly to such a machine for cutting billets from a log block.

An object of this invention is to provide a new and improved billet forming machine.

Another object of this invention is to provide a new and improved billet forming machine for cutting billets from a log block in which an independently operable hold-down member is provided for holding a billet against a support after it is cut from the block to maintain the position of the billet until parts of the machine and the block have been moved away therefrom and operable to free a billet that is caught within the billet cutting saw.

Another object of the invention is to provide a member as defined in the preceding paragraph which is slidably mounted within a hollow drive shaft of a motor to which the barrel saw is connected and which has means including a hydraulic cylinder engageable with the upper end thereof above the motor for operating the member selectively under the control of an operator.

Another object of the invention is to provide a billet forming machine for cutting a cylindrical billet from a log block for use in making bowling pins or the like comprising, a base with a column structure upstanding therefrom, a block supporting table and a billet support pedestal arranged adjacent each other above the base, a pair of block engaging clamps with an upper clamp arranged to engage the upper side of the block and a lower clamp arranged to engage the lower side of the block with the lower clamp having an annular shape to surround said pedestal, means for moving said clamps simultaneously toward and away from each other, a slide mounted on the column structure above the table for up and down movement relative thereto and having a motor mounted thereon with a hollow drive shaft and a barrel saw connected to the lower end of said drive shaft, means for moving the slide up and down, a hold-down member for holding a billet against said pedestal and for freeing a billet from the saw including a rod extending upwardly through said barrel saw and said drive shaft, and means for moving said hold-down member independently of the slide and clamps whereby a billet may be held in desired position until the clamps and the saw have been moved away therefrom to permit free discharge of the billet from the machine.

Further objects and advantages will become apparent from the following detailed description taken in connection with the accompanying drawings in which:

Fig. 2 is a vertical section of the machine taken generally along the line 2—2 in Fig. 1; and Fig. 3 is a horizontal section of a part of the block clamping and supporting mechanism and taken generally along the line 3—3 in Fig. 2.

Figure 1:
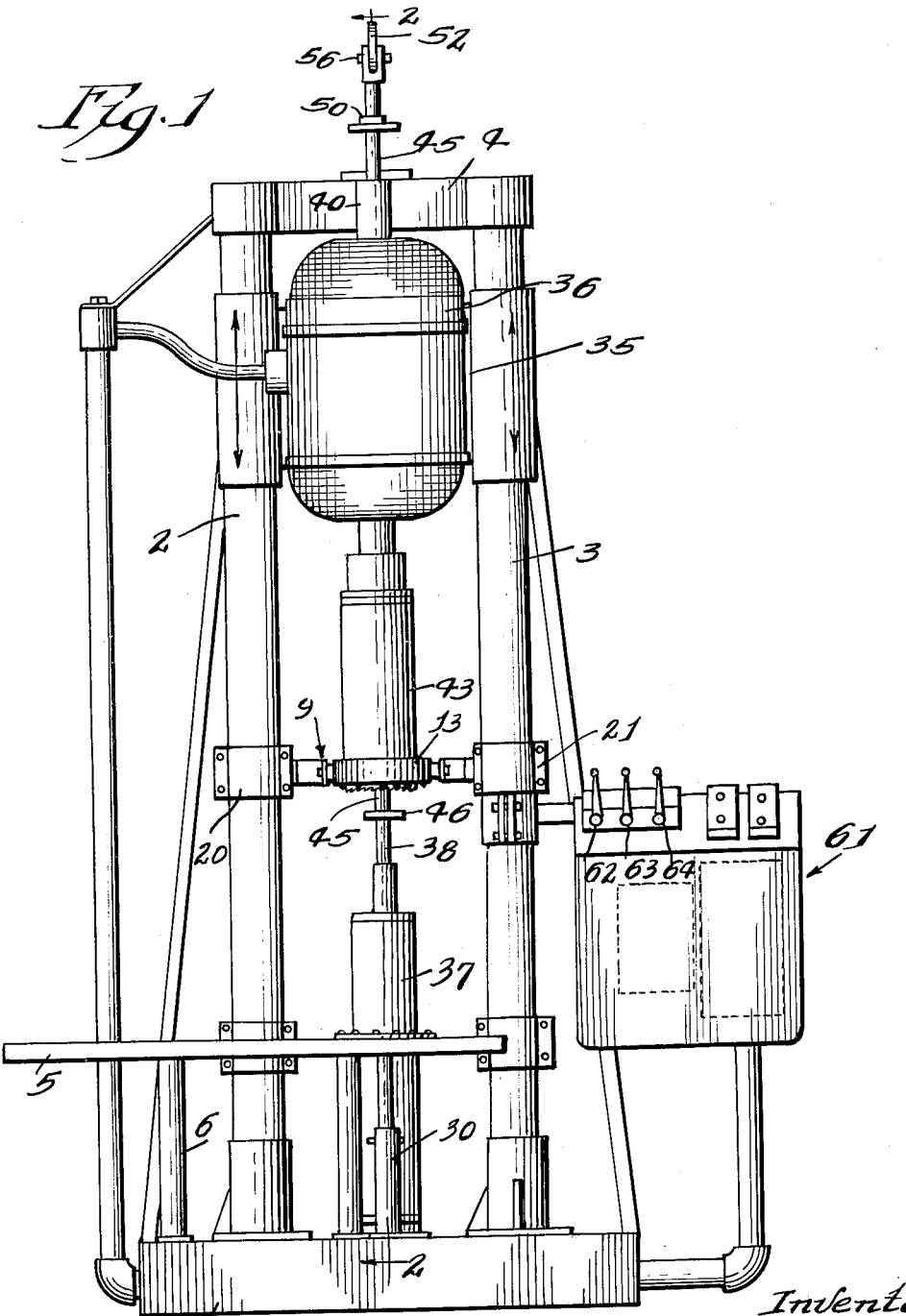
Fig. 1 is a front view in elevation of the billet forming machine.

While this invention is susceptible of embodiments in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

As shown in the drawings, the billet forming machine has a base 1 supporting a column structure including a pair of vertically extending columns 2 and 3 which at their top are connected by a crossbar 4. A block supporting table 5 is supported from the base 1 by a leg 6 and has a plurality of rotatably mounted balls 7 for supporting a log block 8 for relatively free movement on the table.

Means are provided for holding the log block 8 against movement when in cutting position including a clamp mechanism having an upper clamp and a lower clamp indicated generally at 9 and 10, respectively.

Referring particularly to Figs. 2 and 3, the lower clamp 10 has a pair of spaced apart arms 11 and 12 which pivotally support between one pair of their ends an annular clamping jaw 13 having a plurality of teeth 14 extending upwardly therefrom. The jaw 13 has oppositely extending pins 15 and 16 which pivotally mount the jaw to the arms 11 and 12 whereby the jaw may adjust to fully engage the underside of the log block 8. The jaw 13 has a rearwardly extending rod 17 which coacts with a slot 18 in a brace member 19 extending between the arms 11 and 12 to limit the extent of pivotal movement of the jaw 13.

The arms 11 and 12 intermediate their ends are pivotally connected to the columns 2 and 3 by brackets 20 and 21 fastened to the columns 2 and 3, respectively, and each having a pivot pin 22 and 23 pivotally connected to the arms 11 and 12, respectively. At the rear ends of the arms 11 and 12 another brace member 24 is provided therebetween which is pivotally mounted to the lower end of a hydraulic cylinder 25.

The structure of the upper clamp 9 is the same as that of the lower clamp 10 insofar as the description thereof has been given and like reference numerals have been given to similar parts in the two clamps. The brace member 24 of the upper clamp 9 is pivotally connected to a piston rod 26 of the hydraulic cylinder 25 whereby outward movement of the piston rod 26 relative to the cylinder 25 will cause the clamps 9 and 10 to move toward each other to engage the upper and lower sides respectively of the log block 8. The pivotal mounting of the jaws 13 to their supporting arm structure permits sufficient movement of the jaws so as to have their teeth 14 fully inserted in the log block. Opposite movement of the piston rod 26 causes the clamps 9 and 10 to move apart and free the log block.

A pedestal 30 upstanding from the base 1 is positioned adjacent the table 5 to support a billet that is cut from the log block and this pedestal is arranged to lie within the annular jaw 13 of the lower clamp 10 when the clamp 10 is raised into block engaging position. The table 5 has a cutout so as to substantially surround the lower clamp 10, as shown in Fig. 3, to properly support the block 8. The pedestal 30 is provided with a plurality of openings 31 to permit passage of teeth 32 carried by the lower clamp 9 therethrough into engagement with the underside of the pin block 8 and more particularly into engagement with the part of the block that is to form the billet cut therefrom.

The columns 2 and 3 slidably support a slide 35 having an electric motor 36 mounted thereon. The slide is movable toward and away from the table 5 and is caused to move by a hydraulic cylinder 37 secured to the base 1 and having an upwardly extending piston rod 38 connected to the slide 35 by a pin 39. The motor 36 has a hollow drive shaft 40 rotatably mounted therein by upper and lower thrust bearings 41 and 42 respectively. The hollow drive shaft 40 has a barrel saw 43 connected to its lower end whereby rotation of the barrel saw and lowering of the slide 35 will cause the barrel saw 43 to descend down through the upper clamp ring 13, through the block 8 and past the pedestal 30 to cut a billet from the block 8. Reverse movement of the slide 35 carries the barrel saw to a position above the upper clamp 9. During cutting of the billet from the log block, the teeth 32 function to prevent any rotation of the billet as otherwise might be caused by the rotating barrel saw 43.

A movable hold-down member is provided in the form of a rod 45 having a billet engaging end 46. The rod 45 is slidably mounted within the hollow drive shaft 40 by removable bushings 47 and 48. This hold-down member is moved to engage the top of the billet part of the block prior to cutting of the billet and functions to maintain the billet against the pedestal 30 after cutting thereof while the clamps 9 and 10 and the barrel saw 43 are withdrawn and may also function to hold the billet while the block 8 is moved on the table 5. The rod 45 is also guided at its upper end by a bushing 50 supported by a plate 51 carried on the crossbar 4. The rod 45 is operated by a link 52 which is pivotally connected intermediate its ends by a pin 53 to the upper end of an arm 54 upstanding from the plate 51. The arm 54 at its lower end is pivotally mounted to the plate 51 by a pin 55. The operating link 52 at one end is pivotally connected to the hold-down rod 45 by a pin 56 and at its other end is pivotally connected by a pin 57 to a piston rod 58 of a hydraulic cylinder 59 which is pivotally mounted to the crossbar 4 by a pin 60.

A control station is indicated generally at 61 and includes valve members 62, 63 and 64 associated one with each of the clamp operating cylinder 25, the slide operating cylinder 37 and the hold-down operating cylinder 59, respectively.

In operation of the billet forming machine, a block is moved on the table 5 to a desired position to place a section thereof under the barrel saw 43. The valve 64 is then operated to cause the cylinder 59 to move the hold-down rod 45 and the rod end 46 into engagement with the top of the billet part of the block. The valve 62 is then operated to cause cylinder 25 to move the clamps 9 and 10 into clamping position with the top and bottom of the block and the teeth 32 into the billet part of the block. The valve 63 is then operated to cause the cylinder 37 to operate the slide and lower the saw. After the billet has been cut, the slide is raised and the clamps 9 and 10 are released to free the block with the billet still held by the hold-down member against the pedestal 30. The block 8 may then be moved if necessary or, in any event, the hold-down member 45 is then raised to permit removal of the billet from the position in which it has been held.

The independently operable hold-down member also functions to knock out a billet from the saw. Occasionally a billet will get stuck within the saw and the saw tends to carry the billet upwardly therewith. If the billet is caught particularly tight in the saw, the valves 63 and 64 may be operated simultaneously to cause opposite movements of the saw 43 and the hold-down member to knock the billet out of the saw.

I claim:

1. A billet forming machine for cutting a billet from a log block comprising, a base, a column structure upstanding from the base, a block supporting table located at an elevation above the base, a billet supporting pedestal at generally the same elevation as the table and adjacent thereto to support a billet, a pair of block engaging clamps in spaced apart relation with a lower clamp arranged to engage the underside of the block and an upper clamp the upper side of the block, each of said clamps having annular jaws mounted on an arm structure pivoted to the column structure for movement toward and away from the block with the lower clamp surrounding the pedestal, means for moving said clamps simultaneously toward and away from each other, a slide mounted on said column structure above said table for up and down movement relative thereto, a motor mounted on the slide with a hollow drive shaft extending downwardly toward the pedestal, a barrel saw connected to the lower end of said drive shaft, means for moving said slide up and down to move the saw toward and away from the table, a hold-down member for holding a billet against said pedestal including a rod extending upwardly through said barrel saw and said drive shaft, and means engageable with said rod above the motor for reciprocatively moving said hold-down member independently of the movement of the slide whereby after a block is in cutting position the hold-down member may be moved toward the pedestal, the clamps engaged with the block and the barrel saw moved down and up through a cutting cycle and the clamps then withdrawn whereby the block is freed for movement while the billet cut therefrom is still held between the hold-down member and pedestal and alternatively subsequently to the movement of the saw down through the block the hold-down member may be reciprocated from and to the billet to knock the billet positively free of the saw.

2. A billet forming machine as defined in claim 1 having thrust bearings in said motor for rotatably mounting said hollow drive shaft, and said means for reciprocatively moving the hold-down member includes an upstanding arm pivotally mounted on the column structure, a link pivotally mounted intermediate its ends to said arm and at one of its ends to said rod, a hydraulic actuating cylinder pivotally connected to the other end of said link, and means controlling the cylinder for reciprocation of the hold-down member as desired.

3. In a billet forming machine for cutting billets from a log block, means for supporting a log block in cutting position, means for holding the log block against movement during cutting thereof including an upper clamp and a lower clamp selectively engageable with the upper and lower faces respectively of a block, means for cutting a billet from the block including a slide movable up and down relative to said block supporting means, a motor mounted on said slide having a hollow drive shaft, and a barrel saw connected to the lower end of said drive shaft, a support for the underside of a billet cut from the block, a hold-down member reciprocatively mounted within the hollow drive shaft and barrel saw for releasably holding a billet cut from the block against the support and freeing a billet from the saw, and means located above the saw for reciprocating said hold-down member independently of said barrel saw and said block holding means whereby the hold-down member may be reciprocated relative to the saw to apply an impact force to a billet bound in the saw and knock the billet therefrom, said holding means further releasably holding a billet against the support until the clamps, saw and log block are withdrawn therefrom.

4. In a billet forming machine for cutting billets from a log block, a frame, means for supporting a log block in cutting position, means for holding the log block against movement during cutting thereof including an upper clamp and a lower clamp selectively engageable with the upper and lower faces respectively of a block, means for simultaneously moving the clamps, means for cutting a billet from the block including, a slide movable up and down on said frame relative to said block supporting means, a motor mounted on said slide having a hollow drive shaft, and a barrel saw connected to the lower end of said drive shaft, means for moving the slide toward and away from the block supporting means, means for holding a billet cut from the block including a support for the underside of the billet, and a movable rod engageable with the upper side of the billet extending through said hollow drive shaft and said barrel saw, and manually operable means located above the barrel saw for reciprocating said rod independently of the clamps and slide including an upstanding arm pivotally mounted on said frame, a link pivotally mounted intermediate its ends to said arm and at one of its ends to said rod, and a hydraulic cylinder pivotally connected to the other end of said link.

References Cited in the file of this patent

UNITED STATES PATENTS

| | | |
|---|---|---|
| 802,184 | Farnum | Oct. 17, 1905 |
| 1,698,068 | Ranney | Jan. 8, 1929 |
| 2,343,875 | Schwartz | Mar. 14, 1944 |
| 2,454,235 | Tomek | Nov. 16, 1948 |
| 2,463,799 | Palmer | Mar. 8, 1949 |
| 2,680,457 | Kakuk et al. | June 8, 1954 |
| 2,755,827 | Gerding | July 24, 1956 |